(12) United States Patent
Ryu et al.

(10) Patent No.: US 8,615,246 B2
(45) Date of Patent: Dec. 24, 2013

(54) METHOD FOR RECEIVING INFORMATION ON NETWORK CONFIGURATION

(75) Inventors: Jin-Sook Ryu, Gyeonggi-Do (KR);
Ji-Woong Lee, Gyeonggi-Do (KR);
Yung-Mi Kim, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 290 days.

(21) Appl. No.: 13/147,191

(22) PCT Filed: Nov. 25, 2009

(86) PCT No.: PCT/KR2009/006976
§ 371 (c)(1),
(2), (4) Date: Jul. 29, 2011

(87) PCT Pub. No.: WO2010/093113
PCT Pub. Date: Aug. 19, 2010

(65) Prior Publication Data
US 2011/0294536 A1    Dec. 1, 2011

Related U.S. Application Data

(60) Provisional application No. 61/151,188, filed on Feb. 10, 2009.

(30) Foreign Application Priority Data

Apr. 29, 2009   (KR) .................. 10-2009-0037803

(51) Int. Cl.
*H04W 40/00*   (2009.01)
*H04W 72/00*   (2009.01)

(52) U.S. Cl.
USPC ......... 455/446; 455/447; 455/452.2; 455/453

(58) Field of Classification Search
USPC ........................................... 455/446
See application file for complete search history.

(56) References Cited

U.S. PATENT DOCUMENTS 6,778,812 B1   8/2004   Zhang
2009/0005029 A1   1/2009   Wang et al.

FOREIGN PATENT DOCUMENTS

| CN | 101115310 | 1/2008 |
| WO | 2008/081315 | 7/2008 |

OTHER PUBLICATIONS

The State Intellectual Property Office of the People's Republic of China Application No. 200980155378.6 Office Action dated Aug. 22, 2013, 5 pages.

*Primary Examiner* — Huy C Ho
(74) *Attorney, Agent, or Firm* — Lee, Hong, Degerman, Kang & Waimey

(57) ABSTRACT

The present invention provides a method for receiving information on a network configuration. The present invention is to allow a terminal to acquire accurate information on a neighbor cell. Furthermore, the present invention is to remove duplicated information from the information message on a neighbor cell, for instance, Neighboring Cell Information, thereby allowing an effective configuration thereof and preventing from using network resources wastefully.

16 Claims, 5 Drawing Sheets

Fig. 3

```
< E-UTRAN Measurement Parameters Description struct > ::=
    < E-UTRAN_BA_IND : bit >
    < E-UTRAN_CCN_ACTIVE : bit >
    < Qsearch_C_E-UTRAN_Initial : bit(2) >
    < E-UTRAN_Start : bit >
    < E-UTRAN_Stop : bit >
    < E-UTRAN_REP_QUANT : bit >
       { 0 | 1   < E-UTRAN_MULTIRAT_REPORTING : bit(2) > }
       { 0 | 1   < E-UTRAN_FDD_REPORTING_THRESHOLD : bit(3) >
                 < E-UTRAN_FDD_REPORTING_THRESHOLD_2 : bit(6) > }
       { 0 | 1   < E-UTRAN_TDD_REPORTING_THRESHOLD : bit(3) >
                 < E-UTRAN_TDD_REPORTING_THRESHOLD_2 : bit(6) > }
       { 0 | 1   < E-UTRAN_MEASUREMENT_REPORT_OFFSET : bit(6) >
                 < REPORTING_GRANULARITY : bit(1) > }
       { 1 < Repeated E-UTRAN Neighbour Cells : < Repeated E-UTRAN Neighbour Cells struct >> } ** 0 ;

< Repeated E-UTRAN Neighbour Cells struct > ::=
       { 1 < EARFCN : bit (16) >
       { 0 | 1 < Measurement Bandwidth : bit (4) > } } ** 0
         < E-UTRAN PRIORITY : bit(3) >
         < THRESH_E-UTRAN_high: bit(5) >
         { 0 | 1           < THRESH_E-UTRAN_low: bit(5) >
         { 0 | 1           < E-UTRAN_QRXLEVMIN : bit(5) > }
         { 0 | 1 < NOT ALLOWED CELLS : < Not Allowed Cells struct >> } ;

< Not Allowed Cells struct > ::==
           { 1 < PCID : bit (9) > } ** 0   -- explicit PCID coding
           { 0 | 1  < PCID_BITMAP_GROUP : bit (6) > }
           { 1 < PCID_Pattern_length : bit (3) >
              < PCID_Pattern : bit (val(PCID_Pattern_length + 1)) >
              < PCID_pattern_sense : bit (1) >
           } ** 0;
```

Fig. 4

```
< E-UTRAN Measurement Parameters Description struct > ::=
        < E-UTRAN_BA_IND : bit >
        < E-UTRAN_CCN_ACTIVE : bit >
        < Qsearch_P_E-UTRAN : bit(2) >
        { 0 | 1 < E-UTRAN_MULTIRAT_REPORTING : bit(2) > }
        < E-UTRAN_REP_QUANT : bit >
        { 0 | 1 < E-UTRAN_FDD_REPORTING_THRESHOLD : bit(3) >
                    < E-UTRAN_FDD_REPORTING_THRESHOLD_2 : bit(6) > }
        { 0 | 1 < E-UTRAN_TDD_REPORTING_THRESHOLD : bit(3) >
                    < E-UTRAN_TDD_REPORTING_THRESHOLD_2 : bit(6) > }
        { 1 < Repeated E-UTRAN Neighbour Cells : < Repeated E-UTRAN Neighbour Cells struct >> } ** 0 ;

< Repeated E-UTRAN Neighbour Cells struct > ::=
        { 1 < EARFCN : bit (16) >
            < Measurement_Control_E-UTRAN : bit (1) >
            { 0 | 1 < Measurement Bandwidth : bit (4) > } } ** 0
        < E-UTRAN PRIORITY : bit(3) >
        < THRESH_E-UTRAN_high: bit(5) >
        { 0 | 1 < THRESH_E-UTRAN_low: bit(5) >
        { 0 | 1 < E-UTRAN_QRXLEVMIN : bit(5) > }
        { 0 | 1 < NOT ALLOWED CELLS : < Not Allowed Cells struct >> } ;

< Not Allowed Cells struct > ::==
        { 1 < PCID : bit (9) > } ** 0                           -- explicit PCID coding
        { 0 | 1 < PCID_BITMAP_GROUP : bit (6) > }
        { 1 < PCID_Pattern_length : bit (3) >
            < PCID_Pattern : bit (val(PCID_Pattern_length + 1)) >
            < PCID_pattern_sense : bit (1) >
        } ** 0;
```

Fig. 5

```
< E-UTRAN Measurement Parameters Description struct > ::=
    < E-UTRAN_BA_IND : bit >
    < E-UTRAN_CCN_ACTIVE : bit >
    < Qsearch_C_E-UTRAN_Initial : bit(2) >
    < E-UTRAN_Start : bit >
    < E-UTRAN_Stop : bit >
    < E-UTRAN_REP_QUANT : bit >
    { 0 | 1    < E-UTRAN_MULTIRAT_REPORTING : bit(2) > }
    { 0 | 1    < E-UTRAN_FDD_REPORTING_THRESHOLD : bit(3) >
               < E-UTRAN_FDD_REPORTING_THRESHOLD_2 : bit(6) > }
    { 0 | 1    < E-UTRAN_TDD_REPORTING_THRESHOLD : bit(3) >
               < E-UTRAN_TDD_REPORTING_THRESHOLD_2 : bit(6) > }
    { 0 | 1    < E-UTRAN_MEASUREMENT_REPORT_OFFSET : bit(6) >
               < REPORTING_GRANULARITY : bit(1) > }
    { 1 < Repeated E-UTRAN Neighbour Cells : < Repeated E-UTRAN Neighbour Cells struct >> } ** 0
    { 1 < E-UTRAN Not Allowed Cells : < E-UTRAN Not Allowed Cells struct >> } ** 0;

< Repeated E-UTRAN Neighbour Cells struct > ::=
    { 1 < EARFCN : bit (16) >
        { 0 | 1 < Measurement Bandwidth : bit (4) > } } ** 0
    < E-UTRAN PRIORITY : bit(3) >
    < THRESH_E-UTRAN_high: bit(5) >
    { 0 | 1 < THRESH_E-UTRAN_low: bit(5) >
    { 0 | 1 < E-UTRAN_QRXLEVMIN : bit(5) > };

< E-UTRAN Not Allowed Cells struct > ::=
    < NOT ALLOWED CELLS : < Not Allowed Cells struct >>
        { 0 -- Same Not Allowed Cells allocated to all E-UTRAN frequency
        | 1 --Different Not Allowed Cells allocated to different E-UTRAN frequency
            { 1 < E-UTRAN Frequency Index : bit(3) > } ** 0};

< Not Allowed Cells struct > ::==
    { 1 < PCID : bit (9) > } ** 0  -- explicit PCID coding
    { 0 | 1   < PCID_BITMAP_GROUP : bit (6) > }
    { 1 < PCID_Pattern_length : bit (3) >
        < PCID_Pattern : bit (val(PCID_Pattern_length + 1)) >
        < PCID_pattern_sense : bit (1) >
            } ** 0;
```

Fig. 6

```
< E-UTRAN Measurement Parameters Description struct > ::=
    < E-UTRAN_BA_IND : bit >
    < E-UTRAN_CCN_ACTIVE : bit >
    < Qsearch_C_E-UTRAN_Initial : bit(2) >
    < E-UTRAN_Start : bit >
    < E-UTRAN_Stop : bit >
    < E-UTRAN_REP_QUANT : bit >
    { 0 | 1    < E-UTRAN_MULTIRAT_REPORTING : bit(2) > }
    { 0 | 1    < E-UTRAN_FDD_REPORTING_THRESHOLD : bit(3) >
               < E-UTRAN_FDD_REPORTING_THRESHOLD_2 : bit(6) > }
    { 0 | 1    < E-UTRAN_TDD_REPORTING_THRESHOLD : bit(3) >
               < E-UTRAN_TDD_REPORTING_THRESHOLD_2 : bit(6) > }
    { 0 | 1    < E-UTRAN_MEASUREMENT_REPORT_OFFSET : bit(6) >
               < REPORTING_GRANULARITY : bit(1) > }
    { 1 < Repeated E-UTRAN Neighbour Cells : < Repeated E-UTRAN Neighbour Cells struct >> } ** 0
    { 1 < E-UTRAN Not Allowed Cells : < E-UTRAN Not Allowed Cells struct >> } ** 0;

< Repeated E-UTRAN Neighbour Cells struct > ::=
    { 1 < EARFCN : bit (16) >
    { 0 | 1 < Measurement Bandwidth : bit (4) > } } ** 0
        < E-UTRAN PRIORITY : bit(3) >
        < THRESH_E-UTRAN_high: bit(5) >
    { 0 | 1   < THRESH_E-UTRAN_low: bit(5) >
    { 0 | 1   < E-UTRAN_QRXLEVMIN : bit(5) > };

< E-UTRAN Not Allowed Cells struct > ::=
    < NOT ALLOWED CELLS : < Not Allowed Cells struct >>
    { 1 < E-UTRAN Frequency Index : bit(3) > } ** 0;

< Not Allowed Cells struct > ::==
        { 1 < PCID : bit (9) > } ** 0   -- explicit PCID coding
        { 0 | 1    < PCID_BITMAP_GROUP : bit (6) > }
        { 1 < PCID_Pattern_length : bit (3) >
            < PCID_Pattern : bit (val(PCID_Pattern_length + 1)) >
            < PCID_pattern_sense : bit (1) >
        } ** 0;
```

METHOD FOR RECEIVING INFORMATION ON NETWORK CONFIGURATION

CROSS-REFERENCE TO RELATED APPLICATIONS

This application is a 371 U.S. national stage application of International Application No. PCT/KR2009/006976, filed on Nov. 25, 2009, which claims priority to Korean Application No. 10-2009-0037803, filed on Apr. 29, 2009 and U.S. Provisional Application Ser. No. 61/151,188, filed on Feb. 10, 2009, the contents of which are incorporated by reference herein in their entirety.

TECHNICAL FIELD

The present invention relates to a method for receiving information on a network configuration.

BACKGROUND ART

Second-generation mobile communication refers to the transmission and reception of voice in a digital form, such as CDMA, GSM, and the likes. GPRS, which is more advanced than the GSM, has been proposed, and the GPRS is a technology to provide a packet switched data service based upon the GSM system. The GSM/GPRS is a system based upon TDMA.

Third-generation mobile communication refers to the transmission and reception of video and data as well as voice, and 3GPP (Third Generation Partnership Project) developed a mobile communication system (IMT-2000) technology, and adopted WCDMA as a radio access technology (hereinafter, referred to as "RAT"). By combining both of such an IMT-200 technology and a radio access technology (RAT), e.g., WCDMA, it is called UMTS (Universal Mobile Telecommunication System) in Europe. Furthermore, the term UTRAN is an abbreviation of UMTS Terrestrial Radio Access Network.

On the other hand, it is expected in the third-generation mobile communication that data traffic will rapidly increase in the future, and a standardization work is being carried out to make an evolutionary network having a higher bandwidth (Long-Term Evolution Network: LTE).

In the LTE, the term E-UTRAN (Evolved-UTRAN) is used, and OFDMA (Orthogonal Frequency Division Multiple Access) is used as a radio access technology (RAT) in the E-UTRAN.

On the other hand, as various kinds of radio access technologies (RAT) exist as described above, there is a problem in the interoperability between the 2nd-generation GSM/GPRS and the 3rd-generation UMTS. Moreover, a problem also arises in the interoperability between radio access technologies when a new radio access technology (RAT) appears, such as E-UTRAN.

In order to solve the problem, operators provide a roaming service between radio access technologies. It is because the existing equipment is also reusable from a standpoint of those operators. For this purpose, terminals can support multi-RATs. The terminal may take a measurement on neighboring cells of a different RAT (for instance, measured power, RSRP (Reference Signal Received Power), SNR, etc.), and move to a cell of the different RAT. Through this, the terminal can maintain service quality while receiving better signals.

Owing to this, terminals can continually receive a mobile voice and data service.

In other words, when the user of the terminal moves into the UTRAN/E-UTRAN in the state of voice communication in a GERAN (GSM/EDGE Radio Access Network) network, a handover/cell reselection takes place automatically between two networks during a voice call and data session.

FIG. 1 is an exemplary view illustrating a handover between GERAN/E-UTRAN networks.

As illustrated in FIG. 1, a handover/cell reselection is performed when a terminal 10 making a call within the coverage of a base station (BTS) 21 in a GERAN moves into the coverage of a base station (eNode B) 22 in a E-UTRAN.

For such a handover or cell reselection, a serving cell provides information on a neighbor cell, for instance, an E-UTRAN cell, and the terminal performs measurement and/or reports its own measurement result on neighbor cells (e.g., measured power, SNR, etc.) to the network.

Hereinafter, it will be described with reference to the accompanying drawing.

FIG. 2 is a flowchart illustrating a method for receiving information on a neighbor cell according to the related art.

Referring to FIG. 2, a base station 20 of each RAT transmits an information message on a neighbor cell, e.g., Neighboring Cell Information, to the terminal 10 (S11). At this time, the information message on a neighbor cell is transmitted through a broadcast channel or a dedicated channel.

Then, the terminal 10 takes a measurement on SNR, reception power, etc. for the neighbor cells, and may transmit a message for reporting a result of the measurement, e.g., Measurement Report message, to the base station 20 (S12).

Furthermore, the terminal 10 generates a Neighbour cell list and based upon the result of the measurement, and performs a cell reselection or a reports measurement result in accordance with the generated cell list.

However, in the related art, the base station 20 of each RAT transmits an information message on a neighbor cell, e.g., Neighboring Cell Information, in a different format from one another, and thereby it has a problem that the terminal 10 is unable to acquire accurate information on a neighbor cell.

Moreover, an information message on a neighbor cell in the related art, e.g., Neighboring Cell Information, includes unnecessary information in each terminal 10, and thereby network resources are used wastefully.

In addition, an information message on a neighbor cell in the related art, e.g., Neighboring Cell Information, includes duplicated information, thereby it has a problem that network resources are used wastefully.

DISCLOSURE OF INVENTION

Solution to Problem

Therefore, it is an object of the present invention to solve the foregoing problems. In other words, an object of the invention to allows a terminal to acquire accurate information on a neighbor cell.

Furthermore, it is an object of the present invention to effectively configuring an information message on a neighbor cell, e.g., Neighboring Cell Information by removing duplicated information.

In order to accomplish the foregoing object, the present invention provides a method for receiving information on a network configuration. The method for receiving information on a network configuration includes the steps of receiving a message on a network configuration from a network, and generating a Neighbour cell list based upon the message.

On the other hand, in order to accomplish the foregoing object, the present invention provides a terminal accessible to GERAN or E-UTRAN. The terminal includes a transceiver for receiving a message on a network configuration from a network, and a processor coupled with the transceiver to generate a cell reselection list based upon the received message.

The network configuration message includes repeated neighbor cell information, and repeated information on a not-allowed (unallowable) cell. The repeated neighbour cell information includes an EARFCN parameter indicating a radio frequency channel number of an E-UTRAN cell, an Measurement Bandwidth parameter indicating a minimum value of the channel bandwidth of all valid E-UTRAN cells, an E-UTRAN Priority parameter indicating a priority for each RAT or frequency, a threshold parameter indicating an upper or lower threshold for the power of a neighbor cell, and an E-UTRAN_QRXLEVMIN parameter indicating a minimum reception power level that is required on a target E-UTRAN frequency. The repeated information on a not-allowed cell includes an unallowable cell parameter including a PCID parameter indicating a physical layer cell identifier of a not-allowed cell and a PCID BITMAP group parameter indicating a group for the PCIDs of not-allowed cells; and an E-UTRAN frequency index parameter indicating the frequency index of not-allowed cells among the frequencies indicated in the EARFCN parameter.

The present invention is to allow a terminal to acquire accurate information on a neighbor cell.

Furthermore, the present invention is to remove duplicated information from an information message on neighbor cells, e.g., Neighboring Cell Information, thereby allowing an effective configuration and preventing from using network resources wastefully.

According to the present invention, therefore, it is possible to solve the problems in the related art.

BRIEF DESCRIPTION OF DRAWINGS

FIG. 3 is a structural diagram illustrating an information message on a neighbor cell that is transmitted to a Broadcast channel according to a first embodiment of the present invention;

FIG. 4 is a structural diagram illustrating an information message on a neighbor cell that is transmitted to a dedicated channel according to a first embodiment of the present invention;

FIG. 5 is a structural diagram illustrating an information message on a neighbor cell according to a second embodiment of the present invention; and FIG. 6 is a structural diagram illustrating an information message on a neighbor cell according to a third embodiment of the present invention.

MODE FOR THE INVENTION

Figure 1:
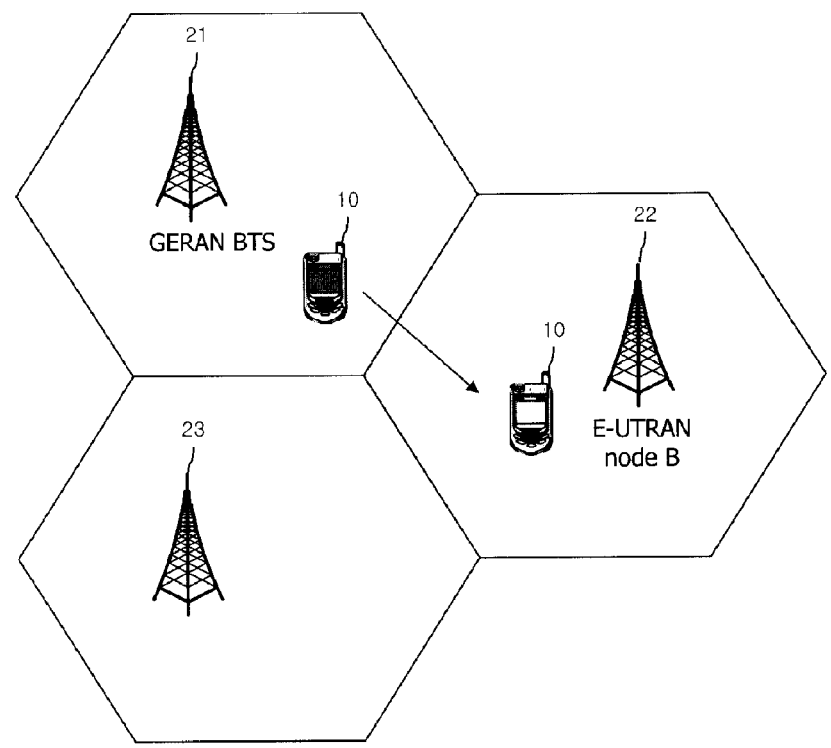
FIG. 1 is an exemplary view illustrating a mobility between GERAN/E-UTRAN networks.
Figure 2:
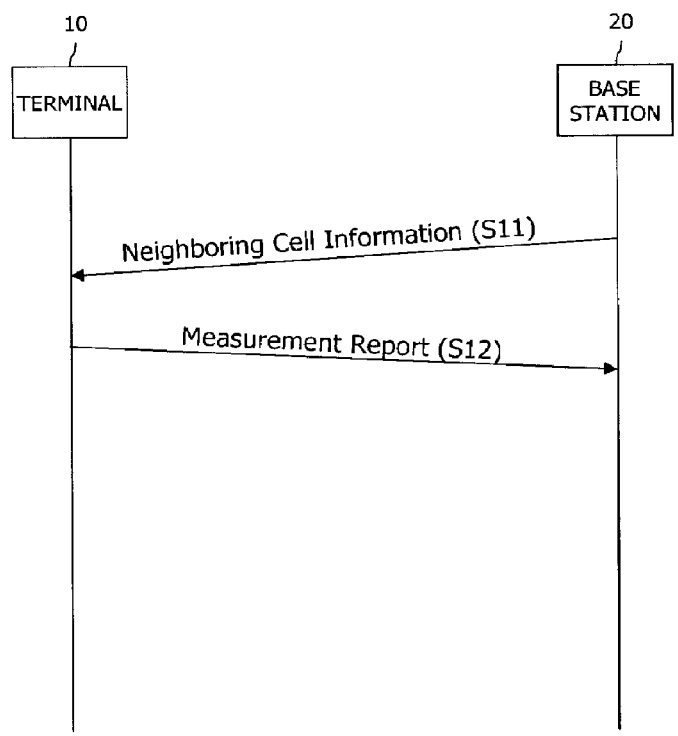
FIG. 2 is a flowchart illustrating a method for receiving information on a neighbor cell according to the related art.

The present invention is applicable to a GERAN and E-UTRAN. However, the present invention is not limited to this, and applicable to all kinds of communication systems to which the technical spirit of the invention is applicable.

It should be noted that technological terms used herein are merely used to describe a specific embodiment, but not to limit the present invention. Also, unless particularly defined otherwise, technological terms used herein should be construed as a meaning that is generally understood by those having ordinary skill in the art to which the invention pertains, and should not be construed too broadly or too narrowly. Furthermore, if technological terms used herein are wrong terms unable to correctly express the spirit of the invention, then they should be replaced by technological terms that are properly understood by those skilled in the art. In addition, general terms used in this invention should be construed based on the definition of dictionary, or the context, and should not be construed too broadly or too narrowly.

Incidentally, unless clearly used otherwise, expressions in the singular number include a plural meaning. In this application, the terms "comprising" and "including" should not be construed to necessarily include all of the elements or steps disclosed herein, and should be construed not to include some of the elements or steps thereof, or should be construed to further include additional elements or steps.

The terms used herein including an ordinal number such as first, second, etc. can be used to describe various elements, but the elements should not be limited by those terms. The terms are used merely to distinguish an element from the other element. For example, a first element may be named to a second element, and similarly, a second element may be named to a first element.

In case where an element is "connected" or "linked" to the other element, it may be directly connected or linked to the other element, but another element may be existed therebetween. On the contrary, in case where an element is "directly connected" or "directly linked" to another element, it should be understood that any other element is not existed therebetween.

Hereinafter, preferred embodiments of the present invention will be described in detail with reference to the accompanying drawings, and the same or similar elements are designated with the same numeral references regardless of the numerals in the drawings and their redundant description will be omitted. In describing the present invention, moreover, the detailed description will be omitted when a specific description for publicly known technologies to which the invention pertains is judged to obscure the gist of the present invention. Also, it should be noted that the accompanying drawings are merely illustrated to easily explain the spirit of the invention, and therefore, they should not be construed to limit the spirit of the invention by the accompanying drawings. The spirit of the invention should be construed as being extended even to all changes, equivalents, and substitutes other than the accompanying drawings.

Hereinafter, the term terminal is used, but the terminal may be also called UE (User Equipment), ME (Mobile Equipment), MS (Mobile Station). Furthermore, the terminal may be portable equipment such as mobile phone, PDA, smart phone, and notebook, or non-portable equipment such as PC, and vehicle-loaded device.

FIG. 3 is a structural diagram illustrating an information message on a neighbor cell that is transmitted on a broadcast channel according to a first embodiment of the present invention, and FIG. 4 is a structural diagram illustrating an information message on a neighbor cell that is transmitted on a dedicated channel according to a first embodiment of the present invention.

As illustrated in FIGS. 3 and 4, the information message on a neighbor cell includes the information for a measurement parameter description structure on a neighbor cell (e.g., E-UTRAN) (i.e., E-UTRAN measurement parameter description struct).

The measurement parameter description structure includes repeated neighbor cell structure information (i.e. Repeated E-UTRAN Neighbor Cells struct) in the lower level.

The repeated neighbor cell structure information includes a parameter on frequency (i.e., EARFCN), a parameter on priority (i.e., E-UTRAN PRIORITY), and a parameter on threshold (i.e. THRESH_E-UTRAN high). Here, the frequency parameter (i.e., EARFCN) indicates radio frequency channel information of an E-UTRAN cell. The priority information (i.e., E-UTRAN PRIORITY) allows the terminal to reselect a cell according to the priority when performing a cell reselection while being in an idle or PTM (Packet Transfer Mode) mode for each RAT or frequency.

Such the repeated neighbor cell structure information is to combine repeated information for the effectiveness of the information message on a neighbor cell. In other words, the cells having the same parameter among many neighbor cells can be shown as a repeated neighbor cell information. For example, when there exist E-UTRAN frequencies, f1 and f2, among neighbor cells, and cells corresponding to the two frequencies have a same priority and parameter, they can be shown as a repeated neighbor cell structure information (i.e., Repeated E-UTRAN Neighbor Cells struct) thereby reducing the amount of the information message on the neighbor cell.

On the other hand, the repeated neighbor cell structure information includes information on a not-allowed cell (i.e., Not Allowed Cell struct) in the lower level. The information on a not-allowed cell includes a PCID parameter indicating a physical-layer cell identifier of an unallowable cell, and a PCID BITMAP group parameter indicating at least one group of the PCIDs of unallowable cells.

As described above, according to a first embodiment, an information message on the neighbor cell, e.g., Neighboring Cell Information (or, E-UTRAN Measurement Parameters Description IE information) includes information on a measurement parameter description structure related to a cell measurement, and repeated neighbor cell structure information (i.e., Repeated E-UTRAN Neighbor Cells struct), and information on a not-allowed cell (i.e., Not Allowed Cell struct).

Furthermore, according to a first embodiment, the information on a not-allowed cell is subordinate to the repeated neighbor cell structure information. Therefore, the repeated neighbor cell structure information includes same measurement information to one another and information on a similarly unallowable cell to one another among many neighbor cells.

However, depending on the circumstances, there is a case where the measurement information and the unallowable information are not same among many neighbor cells. For example, there exist E-UTRAN frequencies, f1 and f2, and cells corresponding to the two frequencies, e.g., C1, C2, C3, and C4, have a similarly unallowable cell to one another, i.e., C5, but their priorities and parameters are different from one another. Or, the cells corresponding to the two frequencies, e.g., C1, C2, C3, and C4 may have same priorities and parameters to one another, but the cells corresponding to f1 may have an unallowable cell, e.g., C5, and the cells corresponding to f2 may have an unallowable cell, e.g., C6.

In such a way, if they do not have same information to one another, then the not-same information cannot be combined into a repeated neighbor cell structure, and should be included in a separate repeated neighbor cell structure within the message on a neighbor cell. In other words, when many neighbor cells corresponding different E-UTRAN frequencies (f1, f2, f3 and f4) have same not-allowed cells (e.g., C5, C6), but the cells corresponding E-UTRAN frequency f1 and f2 have priority 1 and the E-UTRAN frequency f3 and f4 have priority 2, the f1, f2, f3, and f4 cannot be included in a repeated neighbor cell structure. Instead, it is required to have repeated neighbor cell information on the f1 and f2, and repeated neighbor cell information on the f3, f4.

In other words, according to a first embodiment, since the information on a not-allowed cell is subordinate to the repeated neighbor cell structure information, if there exist cells having different priorities even though their information on the not-allowed cells among many neighbor cells are same to one another, information on the cells having different priorities cannot be combined into a repeated neighbor cell structure.

To enhance the first embodiment, according to the present invention a second embodiment is proposed as described below.

FIG. 5 is a structural diagram illustrating an information message on a neighbor cell according to a second embodiment of the present invention.

Referring to FIG. 5, the information on the not-allowed cells structure (E-UTRAN Not Allowed Cells struct) independently exists from the information on the repeated neighbor cell structure (Repeated E-UTRAN Neighbor Cells struct).

The information message on a neighbor cell (E-UTRAN Measurement Parameters Description struct) includes information on a measurement parameter description structure on a neighbor cell (e.g., E-UTRAN) (i.e., E-UTRAN Measurement Parameter Description struct).

The measurement parameter description structure information includes repeated neighbor cell structure information (i.e., Repeated E-UTRAN Neighbor Cells struct) in the lower level.

The repeated neighbor cell structure information includes an EARFCN parameter indicating a radio frequency channel number of an E-UTRAN cell, an Measurement Bandwidth parameter indicating a minimum value of the channel bandwidth of all valid E-UTRAN cells, an E-UTRAN Priority parameter indicating a priority for each RAT or frequency, a Threshold_E-UTRAN high parameter indicating an upper threshold for the power of neighbor cells, a Threshold_E-UTRAN low parameter indicating an lower threshold for the power of neighbor cells, and an E-UTRAN_QRXLEVMIN parameter indicating a minimum reception power level that is required on a target E-UTRAN frequency.

On the other hand, the information message on a neighbor cell includes information on a not-allowed neighbor cell structure, i.e., E-UTRAN Not Allowed Cells struct information, separately from the repeated neighbor cell structure information.

The information on a not-allowed neighbor cell structure, i.e., E-UTRAN Not Allowed Cells struct information, includes a not-allowed cells parameter, i.e., NOT ALLOWED CELLS parameter, and a not-allowed cells structure parameter, i.e., Not Allowed Cells struct parameter.

The not-allowed cells parameter (i.e., NOT ALLOWED CELLS parameter) includes a common not-allowed cells parameter allocated to all E-UTRAN frequencies (i.e., Same Not Allowed Cells allocated to all E-UTRAN frequency parameter), and a different not-allowed cells parameter allocated to different E-UTRAN frequencies (i.e., Different Not Allowed Cells allocated to different E-UTRAN frequency parameter).

The not-allowed cells structure parameter (i.e., Not Allowed Cells struct parameter) includes a PCID parameter indicating a physical layer cell identifier of an unallowable cell, and a PCID BITMAP group parameter indicating a group for the PCIDs of unallowable cells.

The PCID BITMAP group parameter includes a PCID_Pattern length parameter indicating a length of a PCID pattern, and a PCID_Pattern sense parameter for sensing a PCID pattern.

As described above, the foregoing disadvantage of a first embodiment is solved in such a manner that the information message on a neighbor cell according to a second embodiment of the invention (E-UTRAN Measurement Parameters Description struct) includes information on a not-allowed neighbor cell structure, separately from the repeated neighbor cell structure information.

FIG. 6 is a structural diagram illustrating an information message on a neighbor cell according to a third embodiment of the present invention.

The information message on a neighbor cell according to a third embodiment of the present invention, as illustrated in FIG. 6, similarly to the foregoing second embodiment, includes the information on a not-allowed cells structure (E-UTRAN Not Allowed Cells struct), separately from the information on a repeated neighbor cells structure (Repeated E-UTRAN Neighbor Cells struct).

Hereinafter, only different description from that of a second embodiment will be disclosed, and the description of FIG. 5 will be cited for the similar description.

The information on a not-allowed neighbor cells structure (i.e., E-UTRAN Not Allowed Cells struct information) includes a not-allowed cells parameter, i.e., NOT ALLOWED CELLS parameter, and a frequency index parameter, i.e., E-UTRAN Frequency Index parameter.

The not-allowed cells parameter (i.e., NOT ALLOWED CELLS parameter) is similar to the explanation of FIG. 5, and it will be cited for the description.

The frequency index parameter (i.e., E-UTRAN Frequency Index parameter) indicates a frequency index on unallowable cells among the frequencies indicated in the EARFCN parameter. Here, if the frequency index parameter does not exist, then it will be determined that all cells having the frequency indicated by the EARFCN are unallowable.

As described above, the information message on a neighbor cell according to a third embodiment of the invention (E-UTRAN Measurement Parameters Description struct) includes the information on a not-allowed neighbor cell structure, separately from the repeated neighbor cell structure information, and thereby the foregoing disadvantage of a first embodiment is solved.

As described up to this point, the information message on a neighbor cell according to the first to third embodiments of the invention (E-UTRAN Measurement Parameters Description struct) can be transmitted from a base station to a terminal through a BCCH (Broadcast Control Channel) or a PACCH (Packet Associated Control Channel).

Furthermore, the information message on a neighbor cell can be also applicable to System Information 2 quarter, and Packet Measurement Order.

On the other hand, when the information message on a neighbor cell is received, a terminal generates a Neighbour cell list based upon the message. Then, the terminal performs a measurement on a neighbor cell except the not-allowed cell based upon the Neighbour cell list. Then, the terminal performs a cell reselection/measurement report based upon the cell reselection list.

Though it has been described up to this point that the neighbor cell is an E-UTRAN, the neighbor cell may be a UTRAN or GERAN.

As described up to this point, a method according to the present invention can be realized by software, hardware, or their combination. For example, a method according to the present invention can be stored in a storage medium (e.g., built-in memory in a mobile terminal, flash memory, hard disk, etc.), and can be realized by codes or commands within a software program that is executable by a processor (e.g., built-in microprocessor in a mobile terminal).

Though preferred embodiments of present invention are exemplarily described as disclosed above, the scope of the invention is not limited to those specific embodiments, and thus various modifications, variations, and improvements can be made in the present invention without departing from the spirit of the invention, and within the scope of the appended claims.

The invention claimed is:

1. A method for receiving information on network configuration, the method comprising:
   receiving a message for recognizing network configuration from a network,
   wherein the message includes repeated neighbor cell information and repeated information for unallowable cell,
   wherein the repeated neighbor cell information includes:
   an EARFCN (E-UTRA (Evolved Universal Terrestrial Radio Access) Absolute Radio Frequency Channel Number) parameter specifying E-UTRAN (Evolved UMTS (Universal Mobile Telecommunication System) Terrestrial Radio Access Network) absolute radio frequency channel number;
   a Measurement Bandwidth parameter specifying a minimum value of a channel bandwidth of all valid E-UTRAN cells;
   an E-UTRAN priority parameter specifying a priority for each other RAT (radio access technology) or frequency;
   a threshold parameter specifying an upper or lower threshold for power of neighbor cells; and
   an E-UTRAN_QRXLEVMIN (E-UTRAN minimum received signal level) parameter specifying minimum required reception level for cells on a target E-UTRAN frequency, and
   wherein the repeated information for the unallowable cell includes:
   an unallowable cell parameter including a PCID (physical cell ID) parameter specifying a physical layer cell identity of an unallowable cell and PCID BITMAP group parameter specifying at least one group of PCIDs for unallowable cells; and
   an E-UTRAN frequency index parameter specifying a frequency index to the unallowable cells among frequencies represented in the EARFCN parameter; and
   generating a Neighbour cell list based on the message.

2. The method of claim 1, wherein the repeated neighbor cell information and the repeated information for the unallowable cell relate to information commonly used in the network configuration.

3. The method of claim 1, wherein the repeated information for the unallowable cell is included in the message independently from the repeated neighbor cell information.

4. The method of claim 1, wherein the message is received on a BCCH (Broadcast Control Channel) or a PACCH (Packet Associated Control Channel) from the network.

5. The method of claim 1, wherein if E-UTRAN frequency index parameter is not present in the message, unallowable cells are applied to all frequencies specified in the EARFCN parameter of the repeated neighbor cell information.

6. The method of claim 1, further comprising:
   performing a measurement for the neighbor cells except cells specified in the repeated information for the unallowable cell.

7. The method of claim 1, further comprising:
performing at least cell reselection or measurement report based on the generated Neighbour cell list.

8. The method of claim 7, wherein, in the at least cell reselection or measurement report, cells other than cells specified by the repeated information for the unallowable cell are considered as allowed cells to access.

9. The method of claim 1, wherein at least one of the neighbor cells corresponds to at least a UTRAN (UMTS Terrestrial Radio Access Network) cell or an E-UTRAN cell.

10. The method of claim 1, wherein the message is a packet measurement order message.

11. A terminal for accessing GERAN (GSM/EDGE (Global System for Mobile communications/Enhanced Data rates for GSM Evolution) Radio Access Network) and UTRAN/E-UTRAN (UMTS (Universal Mobile Telecommunication System) Terrestrial Radio Access Network/Evolved UTRAN), the terminal comprising:
a transceiver adapted to receive a message for recognizing network configuration from a network,
wherein the message includes repeated neighbor cell information and repeated information for unallowable cell,
wherein the repeated neighbor cell information includes:
an EARFCN (E-UTRA (Evolved Universal Terrestrial Radio Access) Absolute Radio Frequency Channel Number) parameter specifying E-UTRAN absolute radio frequency channel number;
a Measurement Bandwidth parameter specifying a minimum value of a channel bandwidth of all valid E-UTRAN cells;
an E-UTRAN priority parameter specifying a priority for each other RAT (radio access technology) or frequency;
a threshold parameter specifying an upper or lower threshold for power of neighbor cells; and
an E-UTRAN QRXLEVMIN (E-UTRAN minimum received signal level) parameter specifying minimum required reception level for cells on a target E-UTRAN frequency, and
wherein the repeated information for the unallowable cell includes:
an unallowable cell parameter including a PCID (physical cell ID) parameter specifying a physical layer cell identity of an unallowable cell and PCID BITMAP group parameter specifying at least one group of PCIDs for unallowable cells; and
an E-UTRAN frequency index parameter specifying a frequency index to the unallowable cells among frequencies represented in the EARFCN parameter; and
a processor adapted to cooperate with the transceiver thereby to generate a cell reselection list based on the message.

12. The terminal of claim 11, wherein the repeated information for the unallowable cell is included in the message independently from the repeated neighbor cell information.

13. The terminal of claim 11, wherein the message is received on a BCCH (Broadcast Control Channel) or a PACCH (Packet Associated Control Channel) from the network.

14. The terminal of claim 11, wherein if E-UTRAN frequency index parameter is not present in the message, unallowable cells are applied to all frequencies specified in the EARFCN parameter of the repeated neighbor cell information.

15. The terminal of claim 11, wherein the processor is further adapted to:
perform a measurement for the neighbor cells except cells specified in the repeated information for the unallowable cell.

16. The terminal of claim 11, wherein the processor is further adapted to:
perform cell reselection based on the generated cell reselection list,
wherein, in the cell reselection, cells other than cells specified by the repeated information for the unallowable cell are considered as allowed cells to access.

* * * * *